United States Patent [19]
Clemens

[11] Patent Number: 5,195,617
[45] Date of Patent: Mar. 23, 1993

[54] BRAKE LINKAGE SELF-ADJUSTMENT MECHANISM

[75] Inventor: Joseph A. Clemens, Brownsburg, Ind.

[73] Assignee: General Motors Corporation, Detroit, Mich.

[21] Appl. No.: 790,991

[22] Filed: Nov. 12, 1991

[51] Int. Cl.$^5$ .............................................. F16D 65/60
[52] U.S. Cl. ................................ 188/71.8; 188/79.51; 188/79.54; 188/79.62; 188/196 C; 192/70.25; 192/111 A
[58] Field of Search ............... 188/71.8, 79.51, 79.54, 188/79.56, 79.62, 196 R, 196 C, 196 V, 198; 192/70.25, 111 A

[56] References Cited

U.S. PATENT DOCUMENTS

| | | | |
|---|---|---|---|
| 3,365,029 | 1/1968 | Swift | 188/71.8 |
| 4,260,049 | 4/1981 | Fasano | 192/111 A |
| 4,431,101 | 2/1984 | Limbacher | 192/111 A |
| 4,671,400 | 6/1987 | Grunberg et al. | 192/70.25 X |
| 4,706,785 | 11/1987 | Hartz | 188/106 F |

FOREIGN PATENT DOCUMENTS

| | | | |
|---|---|---|---|
| 2152256 | 5/1973 | Fed. Rep. of Germany | 188/71.8 |
| 2142697 | 1/1985 | United Kingdom | 188/71.8 |

*Primary Examiner*—George E. A. Halvosa
*Attorney, Agent, or Firm*—A. Michael Tucker

[57] ABSTRACT

A self-adjustment mechanism for a brake system includes a first sprag clutch seated in a support. An eccentric serves as an inner race for the first sprag clutch and as an outer race for a second sprag clutch. A timing assembly serves as an inner race for the second sprag clutch and includes first and second spaced-apart pins projecting from a surface. An arm is pivotally connected to the timing assembly and positioned between the pins. A brake apply cam engages a first end of the arm so that it pivots with respect to the timing assembly. As the arm pivots, a brake apply piston is engaged. A pivot center of the arm is selectively rotated by the eccentric to maintain the phase relationhip of the cam and the brakepack as the plates wear.

11 Claims, 3 Drawing Sheets

BRAKE LINKAGE SELF-ADJUSTMENT MECHANISM

BACKGROUND OF THE INVENTION

1. Field of the Invention

The present invention relates generally to a brake apply system in a vehicle driven by a cross-drive transmission. In particular, the present invention is concerned with a self-adjustment mechanism provided between a brake apply cam and a brake apply piston, and a method for adjusting the linkage between the brake apply cam and the brake apply piston.

2. Description of the Related Art

Cross-drive transmissions for track-laying vehicles customarily provide an arrangement for decelerating the vehicle by dissipating a portion or all of the vehicle's kinetic energy in brakepacks comprised of multiple friction and reaction disc plates at each output shaft. When a brakepack is compressed during application of the brakes, a decelerating torque is applied to each output shaft. The brakepacks are compressed by axially-stroking apply pistons that are both hydraulically and mechanically applied for some applications. A predetermined range of axial brakepack running clearance must be maintained when the brakes are unapplied to minimize both brake apply time and friction horsepower loss through the brakes. A mechanical adjustment mechanism is normally applied in the brake apply piston linkage to allow maintenance of the axial clearance, compensating for both dimensional manufacturing variations in brake components and frictional wear of brake plate materials.

In certain applications, the service brakes and the emergency/parking brake must be applied through the same pedal. This requirement often complicates the linkage design due to the conflicting ergonomic constraints of maintaining low pedal stroke for the service brake pedal while attaining an adequate combination of pedal stroke and force to take up brakeplate running clearance and provide specified mechanical braking torque. These conflicting requirements can be accommodated through the use of a variable mechanical advantage cam in the brake linkage. Such a cam provides low mechanical advantage when taking up brakeplate running clearance while delivering high mechanical advantage where it is required as the brakepack is clamped. Only a small fraction of the brake pedal stroke is used to take up the running clearance, while most of the stroke is retained for providing the high mechanical advantage during brakepack clamp engagement.

A potential drawback with a cam-based system is that small amounts of brake plate wear translate into significant increases in brake pedal stroke. To avoid this brake pedal stroke increase, frequent brake adjustments are required. Also, the use of brake friction material that resists wear and the use of a brake adjustment mechanism have been utilized in conventional brake systems to overcome pedal stroke increase.

SUMMARY OF THE INVENTION

The present invention includes a brake adjustment mechanism particularly adapted for use in a cross-drive transmission. The mechanism maintains alignment of the high mechanical advantage portion of a brake apply cam with brakepack clamp-up as brake plates wear. The advantage is maintained with proper brakepack clearance and without adding significant drag force to the mechanism. Brake apply timing is not altered as the adjustment mechanism is applied.

In a preferred embodiment, a self-adjustment mechanism for a brake system includes a first sprag clutch seated in a support. An eccentric serves as an inner race for the first sprag clutch and as an outer race for a second sprag clutch. A timing assembly serves as an inner race for the second sprag clutch and includes first and second spaced-apart pins projecting from a surface. An arm is pivotally connected to the timing assembly and positioned between the pins. A brake apply cam engages a first end of the arm so that it pivots with respect to the timing assembly. As the arm pivots, a brake apply piston is engaged. A pivot center of the arm is selectively rotated by the eccentric to maintain the phase relationship of the cam and the brakepack as the plates wear.

DETAILED DESCRIPTION OF THE PREFERRED EMBODIMENT

Figure 1:
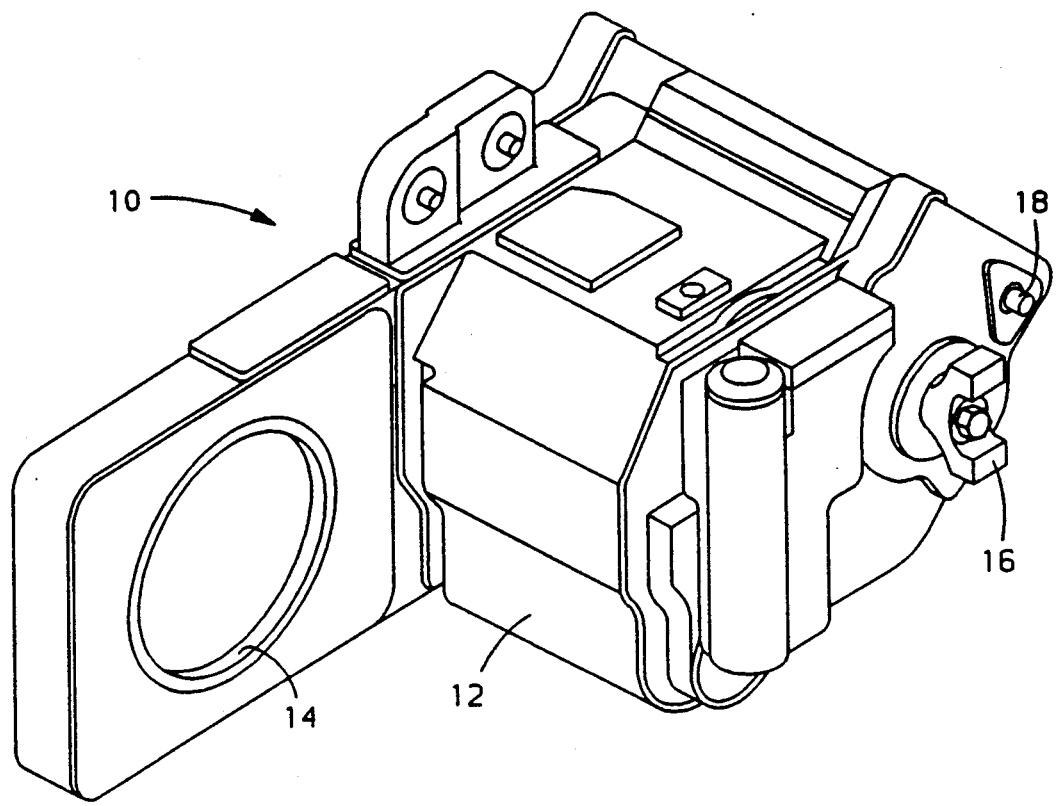
FIG. 1 is a simplified perspective view of a typical cross-drive transmission showing the location of a transmission input, a right-hand transmission output shaft and a right-hand brake apply shaft.

A cross-drive transmission indicated generally at 10 in FIG. 1 is typical of such transmissions used to drive track-laying vehicles. For example, such transmissions may drive tanks, armored vehicles or other military vehicles. Cross-drive transmissions may also be used in civilian applications of track-laying vehicles, and in some instances may be used with other drive arrangements such as road engaging wheels.

The transmission 10 includes a housing 12, a transmission input 14, a right-hand output shaft 16 and a right-hand brake apply shaft 18. A similar left-hand output shaft and a left-hand mechanical brake apply shaft 20 are on the other side of the housing 12 but not shown in the view of FIG. 1. The brake apply shafts 18, 20 are connected to a driver's station by mechanical linkage and/or electrical control means. The shafts 18, 20 respond to driver brake pedal movement to control the hydraulic and mechanical brake systems inside the transmission 10 which are sensitive to rotation of the shafts 18,20.

Figure 2:
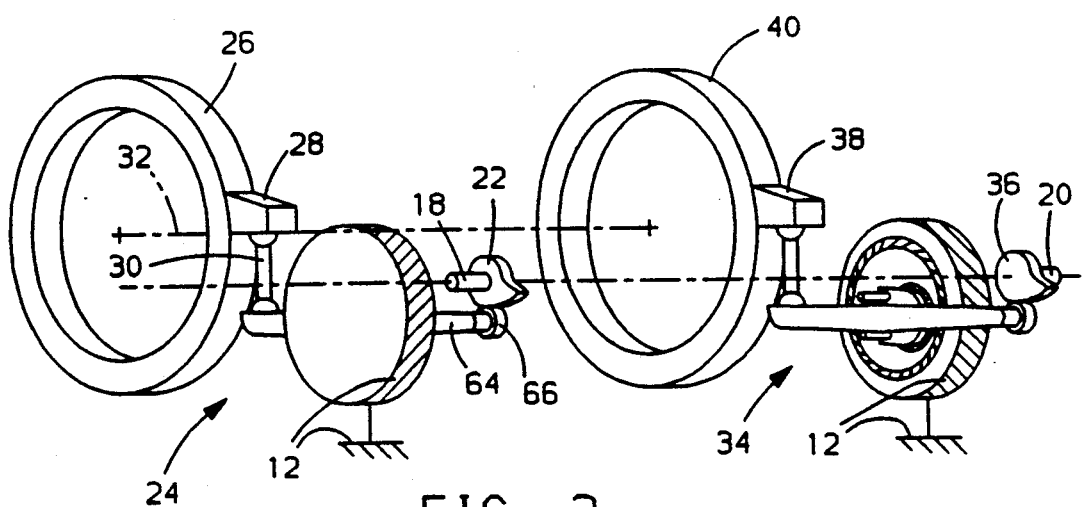
FIG. 2 is a schematic perspective view of a brake apply system for the transmission of FIG. 1 embodying the present self-adjusting mechanism at both the right-hand and left-hand brake apply pistons.

As shown in FIG. 2, the brake apply shaft 18 rotatably drives a variable mechanical advantage cam 22. A self-adjustment mechanism indicated generally at 24 is provided between the cam 22 and a right-hand brake apply piston 26. The apply piston 26 is a ring-like member having a radially outwardly projecting arm 28 on its circumference. When the self-adjustment mechanism 24 is actuated by rotation of the apply shaft 18, a rod 30 pushes against the arm 28 to rotate the apply piston 26. The apply piston 26 is displaced axially along its axis 32 by a well-known ball ramp assembly (not illustrated) to compress a conventional brakepack (not illustrated) inside the housing 12.

In a similar manner, a self-adjustment mechanism 34 is mounted between a variable mechanical advantage cam 36 and an arm 38 of a left-hand brake apply piston 40. When the apply piston 40 is rotated, it is displaced axially along its axis 32 by a respective ball ramp assembly (not illustrated) to compress a respective brakepack (not illustrated).

Figure 3:
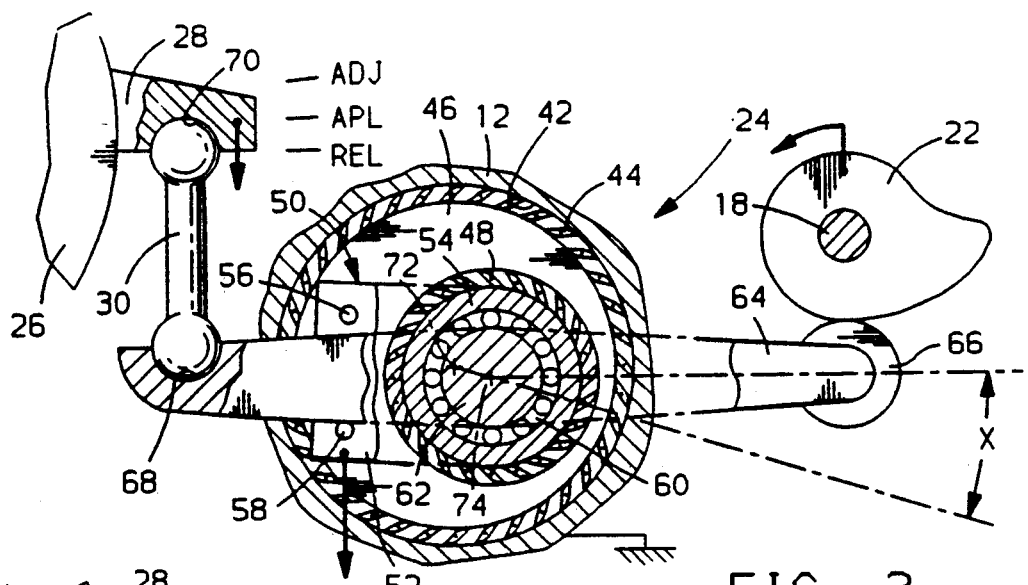
FIG. 3 is a schematic elevational view of the present self-adjustment mechanism illustrated in a "released" or unapplied position.

A detailed view of the self-adjusting mechanism 24 is illustrated in the unapplied or released ("REL") position in FIG. 3. The construction of mechanism 24 is identical to mechanism 34, so that a description of only one mechanism is necessary. The mechanism 24 is mounted in a bore 42 provided in the transmission housing 12. An outer sprag clutch 44 is seated in the bore 42. A disk-like eccentric 46 serves as an inner race for the outer sprag clutch 44 and as the outer race for an inner sprag clutch 48. The outer sprag clutch 44 permits only counterclockwise rotation of the eccentric 46 as described below.

A timer assembly 50 includes a plate 52 affixed to a post 54 seated in the inner race of the inner sprag clutch 48. The inner sprag clutch 48 permits only clockwise rotation of the post 54 as described below. Upper and lower timing pins 56, 58 project from the plate 52. A bore in the timer assembly 50 serves as the outer race for a bearing set 60 which receives a pivot shaft 62. A pivot arm 64 is fixed to and rotates with the pivot shaft 62 as described below. At one end of the pivot arm 64 is a roller 66 which contacts the brake apply cam 22. At the other end of the pivot arm 64 is a pocket 68 for receiving the rod 30 which in turn fits into a corresponding pocket 70 in the arm 28 projecting from the brake apply piston 26. Well-known spring loading illustrated schematically only in FIG. 3 returns the brake apply cam 22, the timer assembly 50 and the brake apply piston 26 to their approximate original positions when the brake apply shaft 18 is released.

In the released position, the pivot arm 64 rests against the lower timing pin 58 and the brake apply piston 26 is axially positioned so as to provide a desired brakeplate running clearance. A center point 72 of the eccentric 46 remains fixed throughout the use of the self-adjusting mechanism 24. As the eccentric 46 rotates about the outer sprag clutch 44, a pivot center 74 of the pivot shaft 62 will rotate. The relative position between the center point 72 and the pivot center 74 is represented by angle X in FIG. 1.

Figure 4:
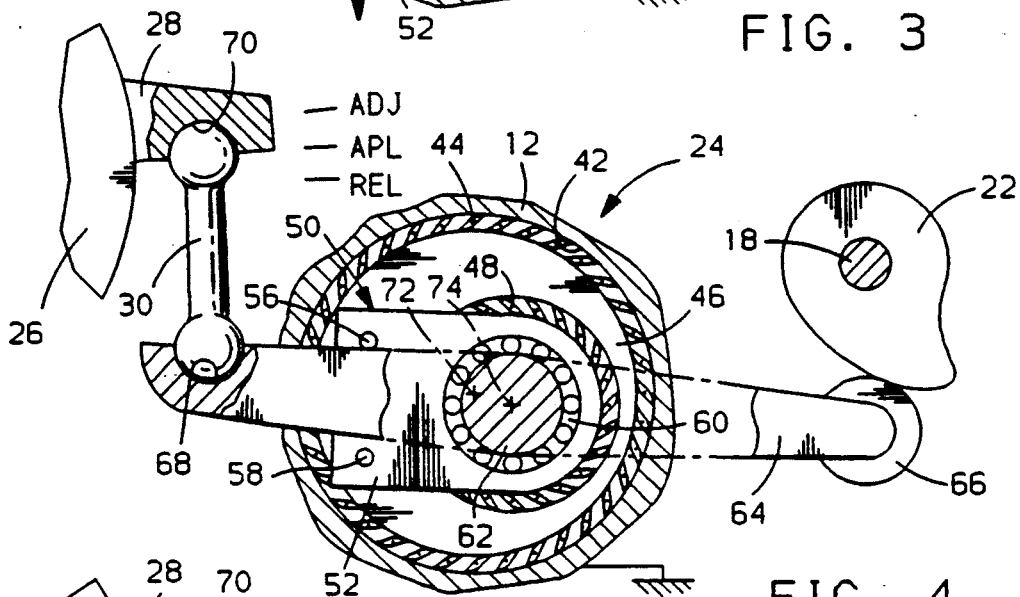
FIG. 4 is a view similar to FIG. 3 wherein a brake apply cam has been rotated clockwise approximately forty-five degrees to an "apply" position.

FIG. 4 illustrates the brake apply cam 22 and brake apply piston 26 rotated to an apply ("APL") position. In this position, the brakeplate pack should clamp so long as the plates are not worn. The arm 64 pivots about pivot center 74 and contacts but does not move the upper pin 56 on the plate 52. Although a clockwise moment is generated about the center point 72, the outer sprag clutch 44 engages, preventing clockwise rotation of the eccentric 46. Therefore, the pivot center 74 does not move.

Figure 5:
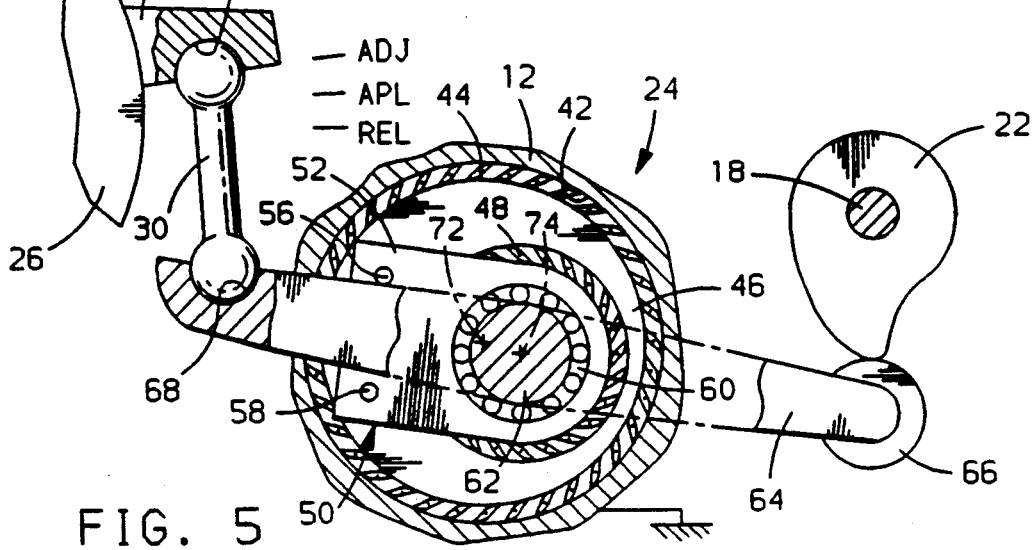
FIG. 5 is a view similar to FIG. 3 wherein the brake apply cam has been rotated clockwise approximately ninety degrees to an "adjust" position.

FIG. 5 illustrates the brake apply cam 22 and the brake apply piston 26 rotated to an adjust ("ADJ") position, which is required to clamp the brakeplate pack if the plates are worn. The pivot arm 64 pushes the upper timing pin 56, rotating the timer assembly 50 clockwise about the pivot center 74, which is permitted by the inner sprag clutch 48. The inner sprag clutch 48, however, prevents spring loading from rotating the plate 52 in a counterclockwise direction as the brakes are released and the pivot arm 64 rotates counterclockwise. As noted above for the apply position, the pivot center 74 does not rotate due to the engagement of the outer sprag clutch 44.

Figure 6:
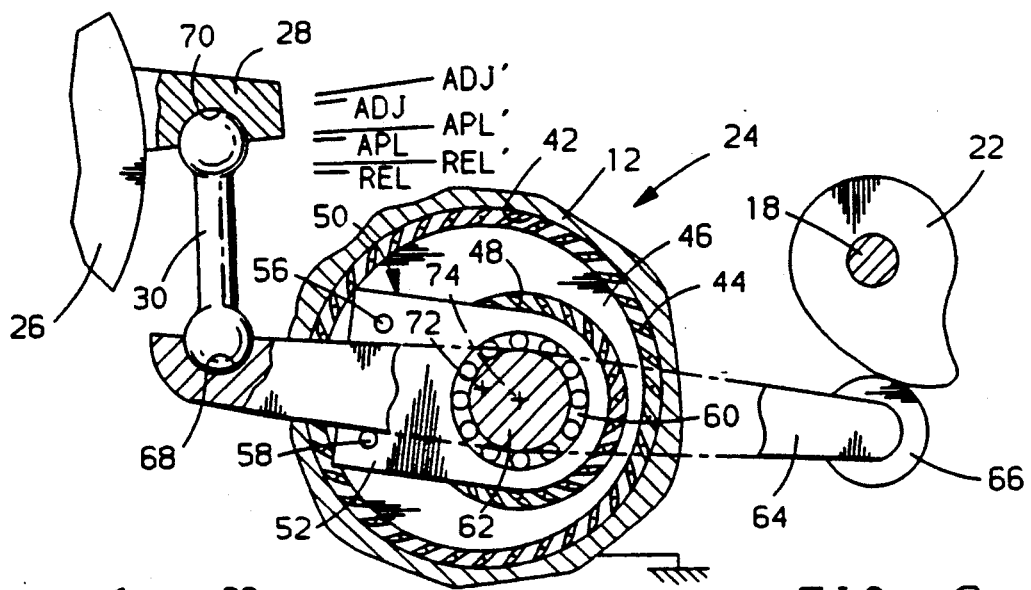
FIG. 6 is a view similar to FIG. 3 wherein the brake apply cam has been released and is rotated counter-clockwise approximately thirty degrees.

In FIG. 6, the brake apply cam 22 has been released and is traveling to its original position via spring loading. The pivot arm 64 rotates counterclockwise and contacts the lower timing pin 58 before reaching the fully released position. The pivot center 74 still has not moved.

Figure 7:
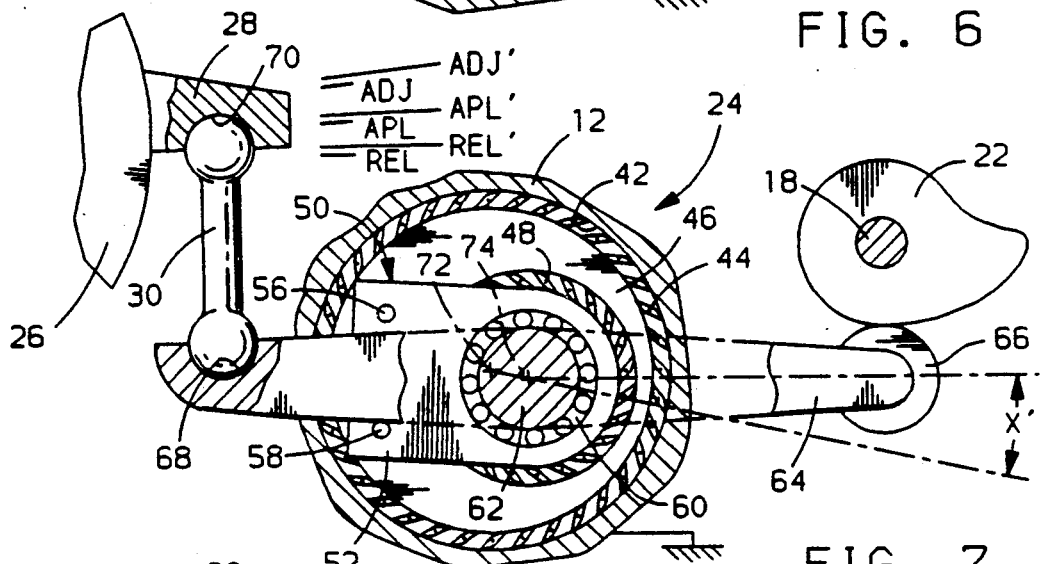
FIG. 7 is a view similar to FIG. 3 wherein the brake apply cam has returned to an adjusted "released" position.

FIG. 7 illustrates the continuing rotation of the pivot arm 64 to the fully released position. The arm 64 pushes on the lower timing pin 58 with sufficient force to rotate the timer assembly 50. Since the inner sprag clutch 48 engages in the counterclockwise direction, the timer assembly 50 and eccentric 46 are locked together. The outer sprag clutch 44 permits counterclockwise rotation of the eccentric 46 and timer assembly 50, resulting in a counterclockwise movement of the pivot center 74 about the center point 72. The relative position between the center point 72 and the pivot center 74 after adjustment by the mechanism 24 is indicated at X' in FIG. 7. The initial position of the pivot ce iter 74 with respect to the center point 72 is such that counterclockwise rotation results in a maximized vertical component of the movement and a minimized horizontal component. The vertical component reduces the brakeplate pack clearance, thereby adjusting the brakes of the transmission 10.

The adjusted position of the brake apply piston 26 is illustrated as a counterclockwise shift. In FIG. 7, the arm 28 is aligned with the mark "REL'" when fully released. This position should be compared to the fully released position prior to adjustment, illustrated with the mark "REL" in FIGS. 3-5.

Figure 8:
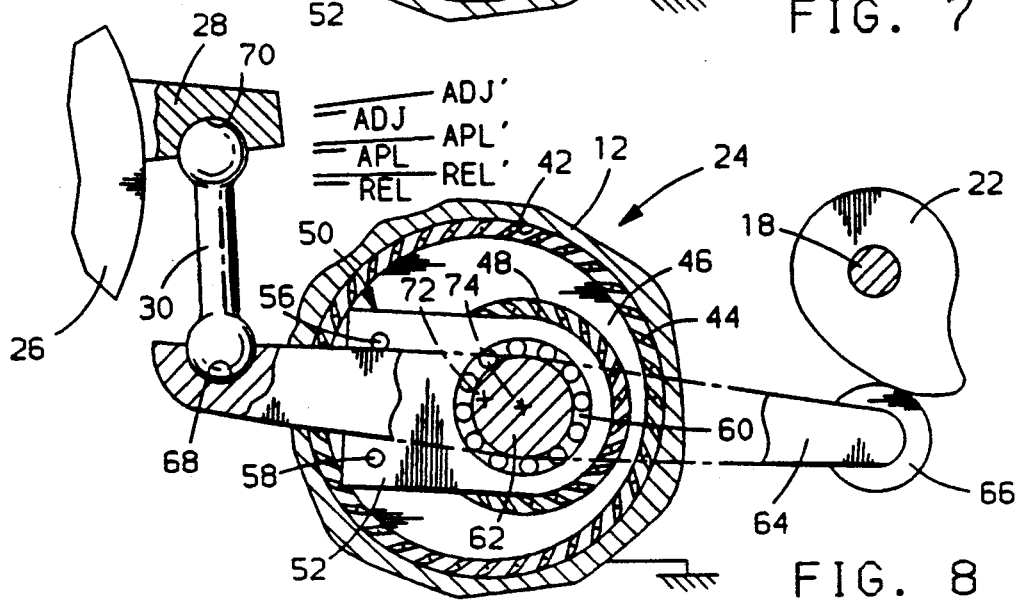
FIG. 8 is a view similar to FIG. 4 wherein the brake apply cam has been rotated clockwise to an adjusted "applied" position.

FIG. 8 illustrates the reapply of the brake apply cam 22 after the self-adjusting assembly 24 has adjusted the brake apply piston 26. The revised position of the pivot center 74 results in the arm 28 stroking to the adjusted apply position ("APL'") required by the worn brakeplates, while the brake apply cam 22 is not rotated further than the original apply position ("APL"). This condition should be contrasted to that shown in FIG. 5 where the brake apply cam 22 must rotate to the adjust ("ADJ") position to accommodate the brakeplate wear, adversely affecting hydraulic apply timing and brake pedal stroke. Because the hydraulic brake apply actuation is accomplished by the shaft 18 locating the cam 22, it can be seen in FIG. 8 that the timing of the hydraulic apply is unaffected by brakeplate wear since the cam 22 rotates the same number of degrees for both new and worn brake packs. The driver's brake pedal stroke will also be maintained despite the brakeplate wear.

It is noted that the amount of travel to accommodate brakeplate wear is exaggerated in the figures for purposes of clarity of illustration. A full self-adjustment of the mechanism 24 generally does not occur for a single apply/reapply cycle, but actually requires several cycles.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A self-adjustment mechanism for use between a brake apply cam and an apply piston in a brake system, comprising:
   (a) a first sprag clutch seated in a support;
   (b) an eccentric functioning as an inner race for the first sprag clutch and as an outer race for a second sprag clutch oriented to permit rotation opposite the first sprag clutch;
   (c) a timing assembly functioning as an inner race for the second sprag clutch, the timing assembly including a post seated in the second sprag clutch and a plate affixed to the post, and first and second spaced-apart pins projecting from a surface of the plate;
   (d) an arm pivotally connected to the timing assembly and positioned between the pins;
   (e) means for pivoting the arm with respect to the timing assembly; and
   (f) means for rotating the apply piston as the timing assembly is pivoted.

2. The self-adjustment mechanism specified in claim 1 including a bore through the post and plate for receiving the arm.

3. The self-adjustment mechanism specified in claim 2 wherein a bearing set pivotally mounts the arm in the bore of the post and plate.

4. The self-adjustment mechanism specified in claim 1 wherein the means for pivoting the arm with respect to the timing assembly includes a roller mounted on the arm for engagement with the brake apply cam.

5. The self-adjustment mechanism specified in claim 1 wherein the means for rotating the apply piston includes a rod mounted between and linking the arm and the apply piston.

6. A self-adjusting assembly for a brake system of a cross-drive transmission, comprising:
   (a) a rotatable rake apply cam;
   (b) a pivoting arm mounted on a timer assembly;
   (c) an eccentric, mounted in the transmission by a first sprag clutch, having a second sprag clutch receiving the timer assembly, wherein the timer assembly is selectively rotated opposite the eccentric and includes a post seated in the second sprag clutch and a plate fixed to the post;
   (d) means for pivoting the arm as the brake apply cam is rotated;
   (e) means for selectively rotating the timer assembly as the arm is pivoted in a first direction; and
   (f) means for rotating a brake apply piston as the arm is pivoted in a second direction.

7. The assembly specified in claim 6 wherein the means for selectively rotating the timer assembly includes a pair of spaced-apart pins mounted on the timer assembly, wherein the arm is received between the pins.

8. The assembly specified in claim 6 wherein means for pivoting the arm includes a roller mounted on the arm for engagement with the brake apply cam.

9. The assembly specified in claim 6 wherein the means for rotating the brake apply piston includes a rod mounted between the arm and the brake apply piston.

10. The assembly specified in claim 6 including a pair of spaced-apart pins on the plate for receiving the arm.

11. The assembly specified in claim 6 wherein a bore in the post and plate pivotally receives a shaft of the pivoting arm.

* * * * *